(12) United States Patent
Aharoni et al.

(10) Patent No.: US 11,487,432 B2
(45) Date of Patent: Nov. 1, 2022

(54) DIRECT RESPONSE TO IO REQUEST IN STORAGE SYSTEM WITH REMOTE REPLICATION

(71) Applicant: EMC IP Holding Company LLC, Hopkinton, MA (US)

(72) Inventors: Dan Aharoni, Brookline, MA (US); Itay Keller, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 102 days.

(21) Appl. No.: 17/065,754

(22) Filed: Oct. 8, 2020

(65) Prior Publication Data

US 2022/0113867 A1 Apr. 14, 2022

(51) Int. Cl.
*G06F 3/06* (2006.01)

(52) U.S. Cl.
CPC .............. *G06F 3/061* (2013.01); *G06F 3/065* (2013.01); *G06F 3/067* (2013.01)

(58) Field of Classification Search
CPC ........... G06F 3/061; G06F 3/065; G06F 3/067
USPC ........................................................ 711/154
See application file for complete search history.

(56) References Cited

U.S. PATENT DOCUMENTS

| | | | |
|---|---|---|---|
| 5,381,539 A | 1/1995 | Yanai et al. | |
| 5,551,003 A | 8/1996 | Mattson et al. | |
| 5,764,880 A | 6/1998 | Gerdt et al. | |
| 6,052,799 A | 4/2000 | Li et al. | |
| 6,941,420 B2 | 9/2005 | Butterworth et al. | |
| 8,843,676 B2 | 9/2014 | Rajamanickam et al. | |
| 9,372,751 B2 | 6/2016 | McNutt | |
| 9,514,014 B2 | 12/2016 | Webman et al. | |
| 9,892,045 B1 | 2/2018 | Douglis et al. | |
| 10,078,598 B1 | 9/2018 | Wallace et al. | |
| 10,331,561 B1 | 6/2019 | Shilane et al. | |

(Continued)

FOREIGN PATENT DOCUMENTS

WO PCT/US2019/024885 1/2020
WO PCT/US2019/024900 1/2020

OTHER PUBLICATIONS

Dell EMC, "Dell EMC VxRack FLEX," Dell EMC Product Overview, 2018, 5 pages.

(Continued)

*Primary Examiner* — Than Nguyen
(74) *Attorney, Agent, or Firm* — Ryan, Mason & Lewis, LLP

(57) ABSTRACT

An apparatus comprising a processing device is configured to communicate with a storage node of a storage system via at least one network and to communicate with a compute node that implements at least a portion of an application via the at least one network. The at least one processing device is configured to obtain an input-output request associated with the application from the compute node via the at least one network and to associate information corresponding to the compute node with the input-output request. The at least one processing device is further configured to submit the input-output request and the associated information that corresponds to the compute node to the storage node. The storage node is configured to submit a response to the input-output request to the compute node via the at least one network based at least in part on the information.

20 Claims, 7 Drawing Sheets

(56) References Cited

U.S. PATENT DOCUMENTS

| | | |
|---|---|---|
| 10,445,180 B2 | 10/2019 | Butterworth et al. |
| 2002/0032835 A1 | 3/2002 | Li et al. |
| 2008/0021853 A1 | 1/2008 | Modha et al. |
| 2009/0204761 A1 | 8/2009 | Caprioli et al. |
| 2009/0276593 A1 | 11/2009 | Jacobson et al. |
| 2013/0305002 A1 | 11/2013 | Hallak et al. |
| 2014/0195847 A1* | 7/2014 | Webman ............. G06F 11/2094 714/6.22 |
| 2014/0244935 A1 | 8/2014 | Ezra et al. |
| 2016/0103764 A1 | 4/2016 | Banerjee et al. |
| 2017/0364290 A1* | 12/2017 | Bhardwaj ............... G06F 16/27 |
| 2018/0113640 A1 | 4/2018 | Fernandez et al. |
| 2018/0267893 A1 | 9/2018 | Barzik et al. |
| 2018/0300075 A1 | 10/2018 | Fernandez et al. |
| 2019/0034505 A1* | 1/2019 | Renauld .................. G06F 3/065 |
| 2019/0196728 A1* | 6/2019 | Feng .................. H04L 67/1097 |
| 2019/0227845 A1 | 7/2019 | Sridhar et al. |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006. 1598129, pp. 200-211.

Wikipedia, "Raft (Computer Science)," https://en.wikipedia.org/wiki/Raft_(computer_science), Feb. 10, 2020, 4 pages.

Wikipedia, "Paxos (ComputerScience)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

U.S. Appl. No. 16/343,942 filed in the name of Yonatan Shtarkman et al., filed Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al., filed Apr. 22, 2019, and entitled "Snapshot-Enabled Storage System Implementing Algorithm for Efficient Reading of Data from Stored Snapshots."

U.S. Appl. No. 16/807,709 filed in the name of Avi Puder et al., filed Mar. 3, 2020, and entitled "Management of Shared Resources in a Software-Defined Storage Environment."

U.S. Appl. No. 16/822,818 filed in the name of Itay Keller et al., filed Mar. 18, 2020, and entitled "Storage System Implementing Snapshot Longevity Ranking for Efficient Management of Snapshots."

U.S. Appl. No. 16/822,848 filed in the name of Itay Keller et al., filed Mar. 18, 2020, and entitled "Assignment of Longevity Ranking Values of Storage Volume Snapshots Based on Snapshot Policies."

U.S. Appl. No. 16/823,813 filed in the name of Itay Keller et al., filed Mar. 19, 2020, and entitled "Managing Incompressible Data in a Compression-Enabled Log-Structured Array Storage System."

U.S. Appl. No. 16/830,469 filed in the name of Roi Tagar et al., filed Mar. 26, 2020, and entitled "Storage Block Balancing Using Volume Part Migration."

U.S. Appl. No. 16/830,473 filed in the name of Yugal Peleg Lieblich et al., filed Mar. 26, 2020, and entitled "Replicated State Cluster with Standby Node State Assessment During Leadership Transition."

U.S. Appl. No. 16/830,946 filed in the name of Gil Ben Zeev et al., filed Mar. 26, 2020, and entitled "Storage Volume Migration Scheduling Based on Storage Volume Priorities and Specified Constraints."

U.S. Appl. No. 16/832,763 filed in the name of Michal Yarimi et al., filed Mar. 27, 2020, and entitled "Managing Storage Device Errors During Processing of Inflight Input/Output Requests."

U.S. Appl. No. 16/834,363 filed in the name of Itay Keller et al., filed Mar. 30, 2020, and entitled "Managing Least Recently Used Cache Using Reduced Memory Footprint Sequence Container."

U.S. Appl. No. 16/836,824 filed in the name of Itay Keller et al., filed Mar. 31, 2020, and entitled "Management of Volume Snapshots in a Data Storage System."

U.S. Appl. No. 16/888,742 filed in the name of Rivka Matosevich et al., filed May 31, 2020, and entitled "Balancing Resiliency and Performance by Selective Use of Degraded Writes and Spare Capacity in Storage Systems."

U.S. Appl. No. 16/918,654 filed in the name of Rivka Matosevich et al., filed Jul. 1, 2020, and entitled "Sharing Memory Resources Between Asynchronous Replication Workloads."

U.S. Appl. No. 16/983,423 filed in the name of Dan Aharoni et al., filed Aug. 3, 2020, and entitled "Deferred Reclamation of Invalidated Entries that are Associated with a Transaction Log in a Log-Structured Array."

U.S. Appl. No. 17/024,912 filed in the name of Anurag Sharma et al., filed Sep. 18, 2020, and entitled "Automatic Discovery and Configuration of Server Nodes."

* cited by examiner

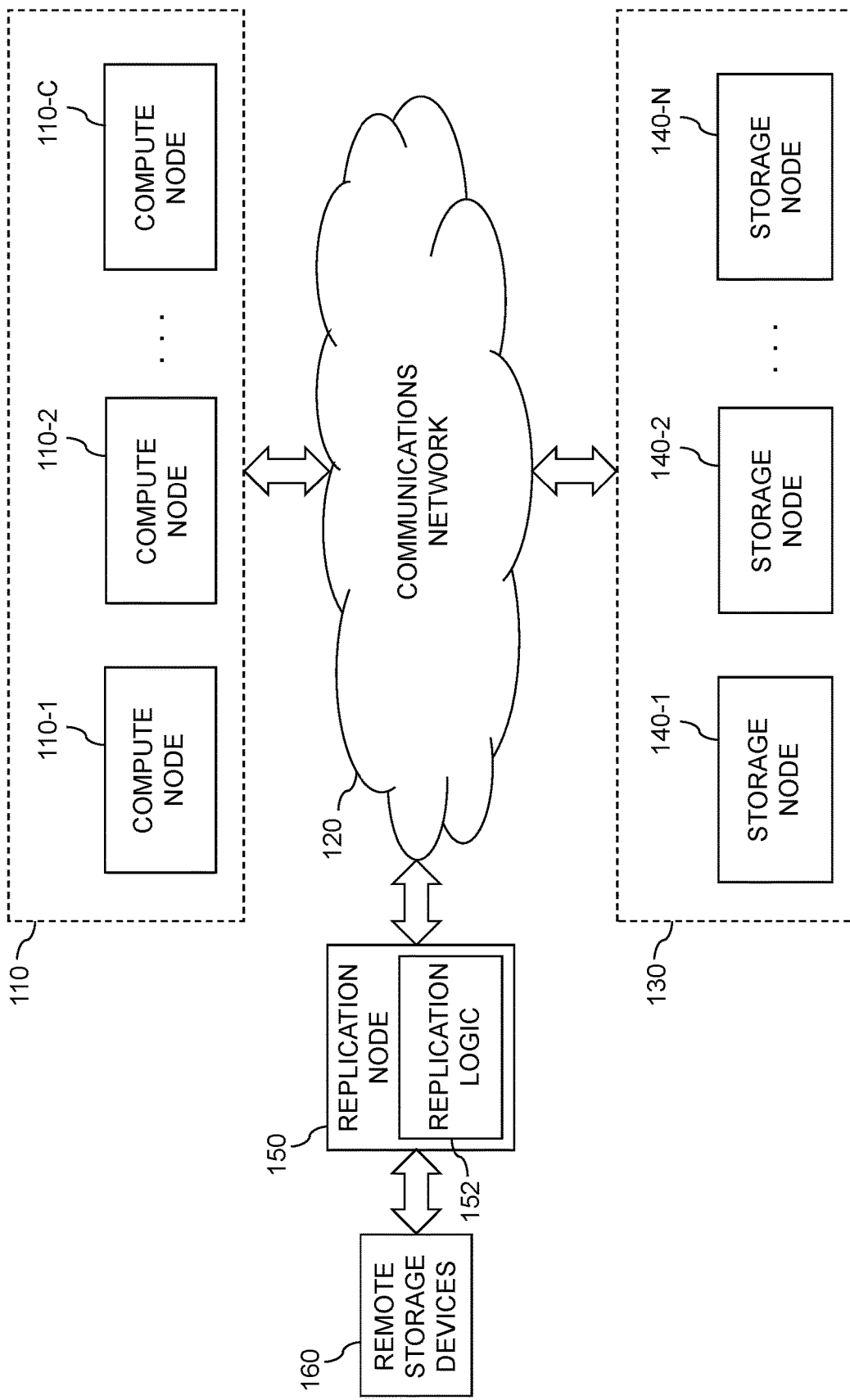

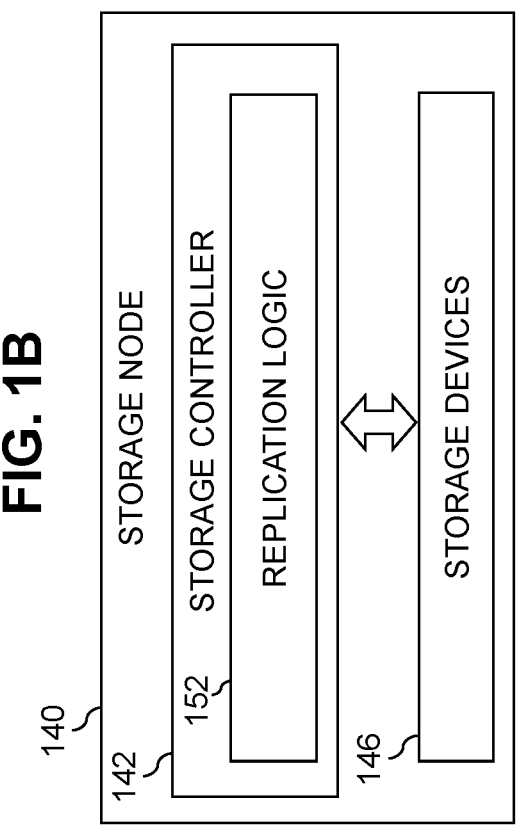

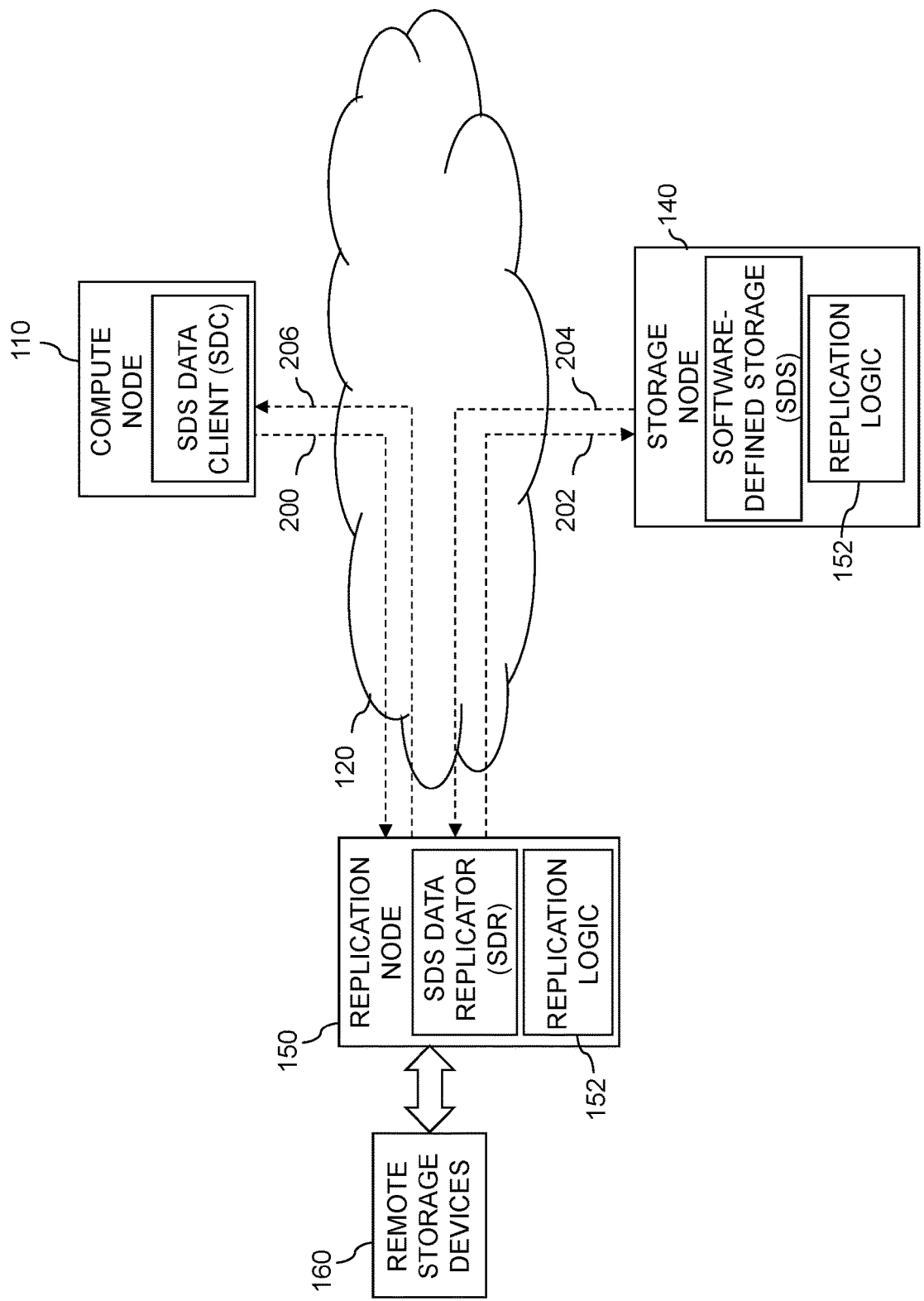

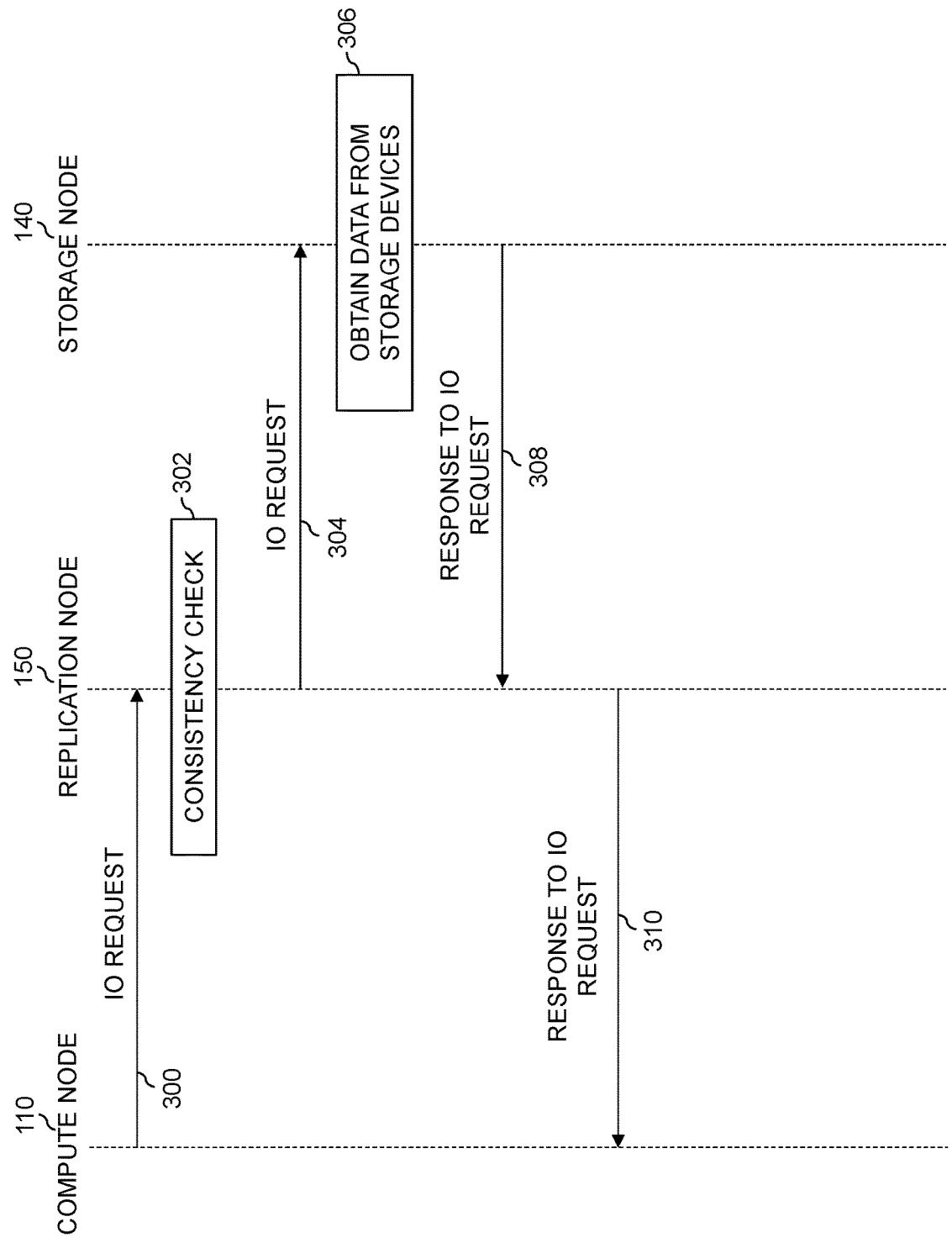

DIRECT RESPONSE TO IO REQUEST IN STORAGE SYSTEM WITH REMOTE REPLICATION

FIELD

This disclosure relates generally to information processing systems, and more particularly to storage in information processing systems.

BACKGROUND

Storage systems sometimes include remote replication functionality that maintains back-up data for corresponding data that is stored on the storage devices of the storage system. The back-up data is often stored in a remote location, e.g., off-site, to ensure that an event which compromises the integrity of the data stored on the storage devices of the storage system will be unlikely to also affect the replicated data. However, the implementation of such remote replication functionality is not without challenges. For example, the use of remote replication functionality may increase both the latency associated with servicing input-output (TO) operations and the bandwidth usage of the storage system.

SUMMARY

In an illustrative embodiment, an apparatus comprises at least one processing device comprising a processor coupled to memory. The apparatus is configured to communicate with a storage node of a storage system via at least one network and to communicate with a compute node that implements at least a portion of an application via the at least one network. The at least one processing device is configured to obtain an IO request associated with the application from the compute node via the at least one network and to associate information corresponding to the compute node with the IO request. The at least one processing device is further configured to submit the IO request and the associated information that corresponds to the compute node to the storage node. The storage node is configured to submit a response to the IO request to the compute node via the at least one network based at least in part on the information.

Other embodiments of the disclosure include, without limitation, server nodes, and articles of manufacture comprising processor-readable storage media for managing incompressible data in a compression-enabled log-structured array storage system.

BRIEF DESCRIPTION OF THE DRAWINGS

FIGS. 1A and 1B schematically illustrate an information processing system comprising a storage system according to an embodiment of the disclosure.

FIG. 2 schematically illustrates an example information processing system that implements remote replication according to an embodiment of the disclosure.

FIG. 3 is a sequence diagram illustrating a sequence for responding to an IO request according to the embodiment of FIG. 2.

DETAILED DESCRIPTION

Figure 4:
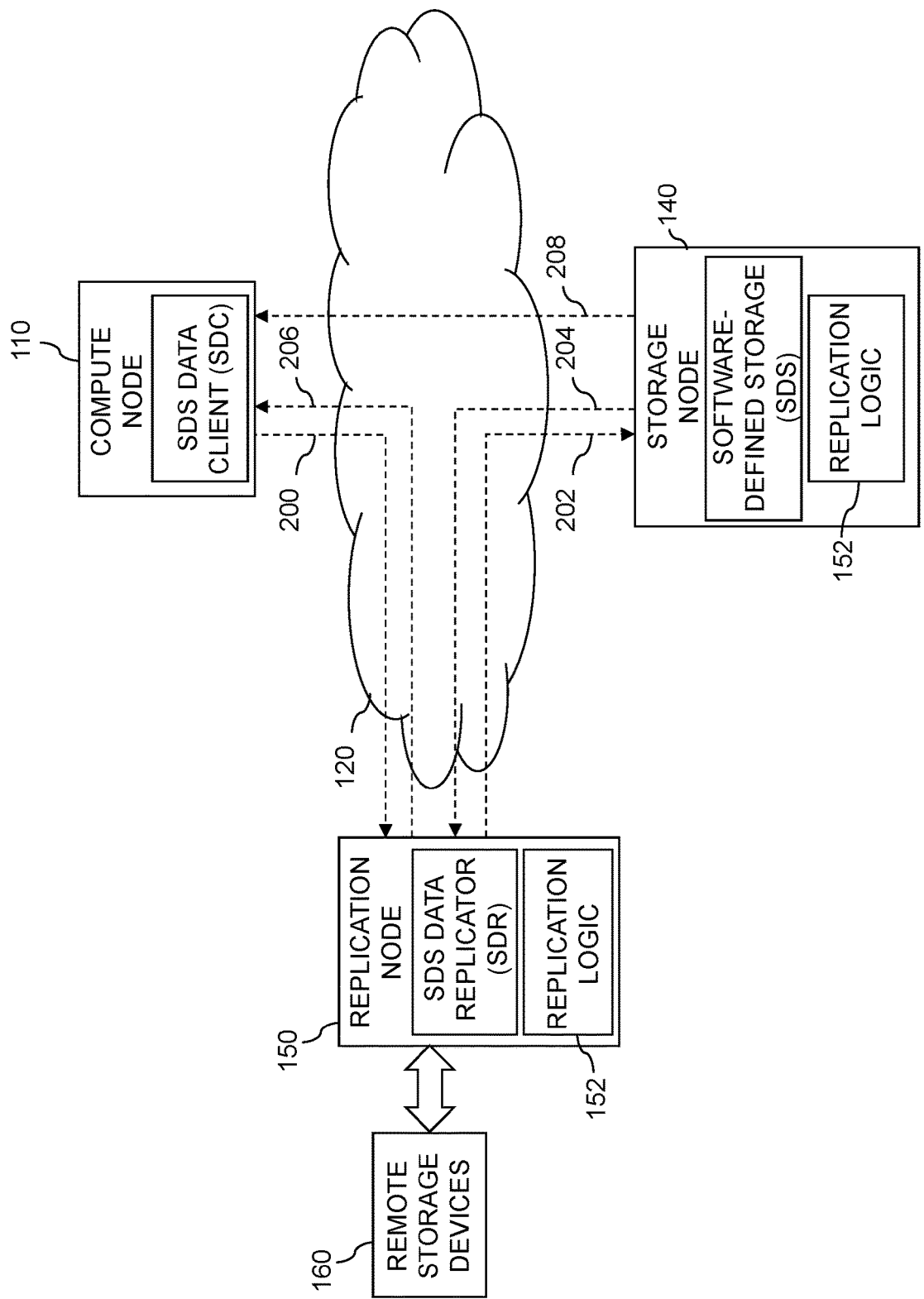
FIG. 4 schematically illustrates an example information processing system that implements remote replication according to another embodiment of the disclosure.

Exemplary embodiments will be described herein with reference to exemplary information processing systems which implement compression-enabled storage systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

FIGS. 1A and 1B schematically illustrate an information processing system comprising a remote replication-enabled storage system according to an exemplary embodiment of the disclosure. More specifically, FIG. 1A schematically illustrates an information processing system 100 which comprises a plurality of compute nodes 110-1, 110-2, . . . , 110-C (collectively referred to as compute nodes 110, or each singularly referred to as a compute node 110), a communications network 120, a data storage system 130, a replication node 150 and remote storage devices 160. The data storage system 130 comprises a plurality of storage nodes 140-1, 140-2, . . . , 140-N (collectively referred to as storage nodes 140, or each singularly referred to as a storage node 140). In the context of the exemplary embodiments described herein, the data storage system 130 comprises a remote replication-enabled data storage system which supports remote replication of data that is stored in the storage media that is accessed and controlled by the storage nodes 140. FIG. 1B schematically illustrates an exemplary framework of at least one or more of the storage nodes 140.

In particular, as shown in FIG. 1B, the storage node 140 comprises a storage controller 142 and a plurality of storage devices 146. In general, the storage controller 142 implements data storage and management methods that are configured to divide the storage capacity of the storage devices 146 into storage pools and logical volumes. Storage controller 142 is further configured to implement replication logic 152 in accordance with the disclosed embodiments, as will be described in further detail below. It is to be noted that the storage controller 142 may include additional modules and other components typically found in conventional implementations of storage controllers and storage systems, although such additional modules and other components are omitted for clarity and simplicity of illustration.

The compute nodes 110 illustratively comprise physical compute nodes and/or virtual compute nodes which process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue input-output (10) requests that are processed by a corresponding one of the storage nodes 140. The term "input-output" as used herein refers to at least one of input and output. For example, IO requests may comprise write requests and/or read requests directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement IO channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly constructed and not viewed as being limited to storage systems of any particular type or types. In some embodiments, the storage nodes 140 comprise storage server nodes having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed, and a storage system in some embodiments can be implemented using a combination of storage nodes and compute nodes.

In some embodiments, as schematically illustrated in FIG. 1B, the storage node 140 is a physical server node or storage appliance, wherein the storage devices 146 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). These and various combinations of multiple different types of storage devices 146 may be implemented in the storage node 140. In this regard, the term "storage device" as used herein is intended to be broadly construed, so as to encompass, for example, SSDs, HDDs, flash drives, hybrid drives or other types of storage media. The data storage devices 146 are connected to the storage node 140 through any suitable host interface, e.g., a host bus adapter, using suitable protocols such as ATA, SATA, eSATA, NVMe, NVMeOF, SCSI, SAS, etc. In other embodiments, the storage node 140 can be network connected to one or more NAS nodes over a local area network.

The storage controller 142 is configured to manage the storage devices 146 and control 10 access to the storage devices 146 and/or other storage resources (e.g., DAS or NAS resources) that are directly attached or network-connected to the storage node 140. In some embodiments, the storage controller 142 is a component (e.g., storage data server) of a software-defined storage (SDS) system which supports the virtualization of the storage devices 146 by separating the control and management software from the hardware architecture. More specifically, in a software-defined storage environment, the storage controller 142 comprises an SDS storage data server that is configured to abstract storage access services from the underlying storage hardware to thereby control and manage IO requests issued by the compute nodes 110, as well as to support networking and connectivity. In this instance, the storage controller 142 comprises a software layer that is hosted by the storage node 140 and deployed in the data path between the compute nodes 110 and the storage devices 146 of the storage node 140, and is configured to respond to data IO requests from the compute nodes 110 by accessing the storage devices 146 to store/retrieve data to/from the storage devices 146 based on the IO requests.

In a software-defined storage environment, the storage controller 142 is configured to provision, orchestrate and manage the local storage resources (e.g., the storage devices 146) of the storage node 140. For example, the storage controller 142 implements methods that are configured to create and manage storage pools (e.g., virtual pools of block storage) by aggregating capacity from the storage devices 146. The storage controller 142 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device only includes either HDD devices or SSD devices, etc.).

In the software-defined storage environment, each of the storage nodes 140 in FIG. 1A can run an instance of the storage controller 142 to convert the respective local storage resources (e.g., DAS storage devices and/or NAS storage devices) of the storage nodes 140 into local block storage.

Each instance of the storage controller 142 contributes some or all of its local block storage (HDDs, SSDs, PCIe, NVMe and flash cards) to an aggregated pool of storage of a storage server node cluster (e.g., cluster of storage nodes 140) to implement a server-based storage area network (SAN) (e.g., virtual SAN). In this configuration, each storage server node 140 is part of a loosely coupled server cluster which enables "scale-out" of the software-defined storage environment, wherein each instance of the storage controller 142 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage controllers 142 operating as SDS storage data servers to create and expose volumes of a storage layer, the software-defined storage environment comprises other components such as (i) SDS data clients that consume the storage layer and (ii) SDS metadata managers that coordinate the storage layer, which are not specifically shown in FIG. 1A. More specifically, on the client-side (e.g., compute nodes 110), an SDS data client (SDC) is a lightweight block device driver that is deployed on each server node that consumes the shared block storage volumes exposed by the storage controllers 142. In particular, the SDCs run on the same servers as the compute nodes 110 which require access to the block devices that are exposed and managed by the storage controllers 142 of the storage nodes 140. The SDC exposes block devices representing the virtual storage volumes that are currently mapped to that host. In particular, the SDC serves as a block driver for a client (server), wherein the SDC intercepts IO requests, and utilizes the intercepted IO request to access the block storage that is managed by the storage controllers 142. The SDC provides the operating system or hypervisor (which runs the SDC) access to the logical block devices (e.g., volumes).

The SDCs have knowledge of which SDS control systems (e.g., storage controller 142) hold its block data, so multipathing can be accomplished natively through the SDCs. In particular, each SDC knows how to direct an IO request to the relevant destination SDS storage data server (e.g., storage controller 142). In this regard, there is no central point of routing, and each SDC performs is own routing independent from any other SDC. This implementation prevents unnecessary network traffic and redundant SDS resource usage. Each SDC maintains peer-to-peer connections to every SDS storage controller 142 that manages the storage pool. A given SDC can communicate over multiple pathways to all of the storage nodes 140 which store data that is associated with a given IO request. This multi-point peer-to-peer fashion allows the SDS to read and write data to and from all points simultaneously, eliminating bottlenecks and quickly routing around failed paths.

The SDS metadata manager components are deployed on multiple server nodes and operate in a manner which forms a tightly coupled cluster that is configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that is required for system operation of the SDS environment such as configuration changes, managing the SDS data clients and data servers, device mapping, values, snapshots, system capacity including device allocations and/or release of capacity, RAID protection, errors and failures, and system rebuild tasks including rebalancing.

Regardless of the specific implementation of the storage environment, as noted above, the storage controller 142 of FIG. 1B provides data storage and management methods that are configured to implement any suitable logical volume management (LVM) system which is configured, e.g., to create and manage local storage volumes by aggregating the storage devices 146 into one or more virtual storage pools that are thin-provisioned for maximum capacity, and logically divide each storage pool into one or more storage volumes that are exposed as block devices (e.g., raw logical unit numbers (LUNs)) to the compute nodes 110 to store data.

In some embodiments, the storage pools are primarily utilized to group storage devices based on device types and performance. For example, SSDs are grouped into SSD pools, and HDDs are grouped into HDD pools. Furthermore, in some embodiments, the storage virtualization and storage controllers 142 implement methods to support various data storage management services such as data protection, data migration, data deduplication, replication, thin provisioning, snapshots, data backups, etc.

With reference again to FIGS. 1A and 1B, information processing system 100 may also implement remote replication, e.g., through the use of a replication node 150 that manages the replication of data stored on the storage devices 146 of the storage nodes 140 to remote storage devices 160. In some embodiments, the replication node 150 comprises one or more processing devices each having a processor and a memory and may comprise similar functionality to that described above for storage nodes 140 but is configured for storing replication data on remote storage devices 160. For example, replication node 150 may comprise additional functionality for processing incoming IO requests to ensure data consistency between the data stored on the storage devices 146 (FIG. 1B) and the data stored on the remote storage devices 160. In some embodiments, one or more of storage nodes 140 may comprise at least a portion of the functionality of the replication node 150. In some embodiments, one or more of compute nodes 110 may comprise at least a portion of the functionality of the replication node 150. In some embodiments, at least a portion of the functionality of the replication node 150 may be implemented separately from compute nodes 110 and storage nodes 140, for example, on another node.

The remote storage devices 160 may comprise DAS resources (internal and/or external storage resources) such as hard-disk drives (HDDs), solid-state drives (SSDs), Flash memory cards, or other types of non-volatile memory (NVM) devices such non-volatile random-access memory (NVRAM), phase-change RAM (PC-RAM) and magnetic RAM (MRAM). These and various combinations of multiple different types of remote storage devices 160 may be implemented within the replication node 150 or separately from the replication node 150. In the case where the remote storage devices 160 are implemented within the replication node 150, the remote storage devices 160 may be connected to the replication node 150 through any suitable host interface, e.g., a host bus adapter, using suitable protocols such as ATA, SATA, eSATA, NVMe, SCSI, SAS, etc. In other embodiments, the replication node 150 can be network connected to one or more NAS or other nodes comprising the remote storage device 160 over a local area network, wide area network, the internet, wirelessly, or via any other communication medium. In some embodiments, remote storage devices 160 may be physically located separately from replication node 150, e.g., in a different portion of the same building in the same data storage facility as the replication node 150, in a different building of the same data storage facility as the replication node 150, in a separate data storage facility that is geographically remote from the data storage facility comprising the replication node 150, in a different town, state or country than the replication node 150 or in any other location that is physically distinct from the replication node 150.

In some embodiments, in addition to the storage controllers 142 operating as SDS storage data servers and the compute nodes 110 implementing SDCs, replication node 150 may implement an SDS data replicator (SDR). The SDR is a lightweight block device driver that is deployed on the replication node 150 and is configured to manage replication and ensure consistency between the data stored on the storage devices 146 and the replicated data stored on the remote storage devices 160. In particular, the SDR acts as an intermediary between the SDCs and the SDSs to handle replication related operations for IO requests submitted by the compute nodes 110 to the storage nodes 140.

The introduction of the SDR into the flow of IO requests between the compute nodes 110 and storage nodes 140 may often add overhead to the application workload. With reference to FIG. 2, for example, during read IO requests, the IO requests from the application are first sent by the SDC along a communication pathway 200 to the SDR of the replication node 150 via the network 120 so that the SDR can guarantee the consistency of the data to be read from the storage devices 146 before the IO request. If the consistency is confirmed, e.g., there are no inflight write requests, data awaiting destaging or other potential inconsistencies, the SDR then provides the IO requests to the SDS of the storage node 140 along a communication pathway 202. This process generally adds an additional network hop to any read requests being submitted to the storage nodes 140, which effectively doubles the read response time and may cause the maximum read bandwidth of the storage system to be about half of the network bandwidth limit.

When a response to a read request is to be returned to a compute node 110, the SDS of the storage node 140 provides the response and accompanying data back to the SDR of the replication node 150 along a communication pathway 204. The SDR then forwards the response and data back to the SDC of the compute node 110 along a pathway 206. This response process also requires additional hops and bandwidth usage which may further impinge the read response time and network bandwidth. This is especially the case since the data is being sent not only to the compute node 110 but also to the intermediary replication node 150.

When an end user of the compute nodes 110 add asynchronous remote replication functionality, e.g., through the use of replication nodes 150, they often expect the remote replication functionality to have a minimal impact on the throughput of the storage system as compared to a workload without replication. As mentioned above, however, the addition of remote replication may cause a significant impact on the read response time and network bandwidth usage due the need for an additional hop in each direction between the compute nodes 110, replication nodes 150 and storage nodes 140 as compared to a system that submits the IO requests from the compute nodes 110 to the storage nodes 140 without a replication node 150 intermediary.

With reference to FIG. 3, for example, when an IO request of an application such as, e.g., a read request, is selected for submission to the storage nodes 140 by the SDC of a compute node 110, the IO request is first submitted to the replication node 150 by the SDC at step 300.

At step 302, the SDR of the replication node 150 performs a consistency check for the data associated with the IO request and determines that the data is consistent. For example, the SDR may determine whether or not there is a pending write IO request for the corresponding data stored in cache and awaiting destaging or may perform other similar determinations.

At step 304, having determined that the consistency check is ok for this IO request, the SDR of the replication node 150 forwards the IO request to the storage node 140 for processing.

At step 306, the SDS of the storage node 140 processes the IO request and obtains the corresponding data from the storage devices 146.

At step 308, the SDS of the storage node 140 provides a response to the IO request to the replication node 150. In some embodiments, the response may also comprise data associated with the IO request.

At step 310, the SDR forwards the response to the compute node 110 and the SDC of the compute node 110 processes the response and provides the data to the application.

As can be seen in the sequence diagram of FIG. 3, when remote replication is implemented, the IO request and the response to the IO request travel two network hops in each direction, one between the compute node 110 and the replication node 150, and one between the replication node 150 and the storage node 140. For large IO requests, where the available network bandwidth is being utilized as much as possible to submit the response and data, the extra hop will cause the maximum available bandwidth on the network 120 to be approximately halved as compared to a case where replication is not being utilized and the response is sent to the SDC of the compute node 110 by the SDS of the storage node 140 without first being sent to the SDR of the replication node 150.

With reference now to FIG. 4, in illustrative embodiments, replication logic 152 may be implemented by replication node 150, storage node 140, or in part by replication node 150 and in part by storage node 140. Replication logic 152 is configured to at least partially alleviate the burden on the available bandwidth of the network 120 associated with the use of remote replication services by providing separate communication paths for the IO request and the response to the IO request. As seen in FIG. 4, for example, an additional communication path 208 between storage node 140 and compute node 110 may be utilized by replication logic 152 in addition to communication paths 200, 202, 204 and 206.

As an example, when the SDC of the compute node 110 submits an IO request to the storage system, the IO request is first obtained by the SDR of the replication node via communication pathway 200 and checked for data consistency as described above. If the data is determined to be consistent by the SDR, the SDR submits the IO request to the SDS of the storage node 140, e.g., via communication pathway 202.

In this case, when the data is retrieved and a response to the IO request is generated by the SDS of the storage node 140, the replication logic 152 utilizes the SDS to submit the response and corresponding data to the SDC of the compute node 110 via communication pathway 208 instead of returning the response and data back to the SDR of the replication node 150 via communication pathway 206. In this manner, the additional network hop to the replication node 150 for the response and corresponding data may be avoided.

In some embodiments, for example, when the replication logic 152 or portion thereof residing on the replication node 150 determines that the data corresponding to the IO request passes the consistency check, the replication logic 152 may submit information associated with the corresponding compute node 110 from which it received the IO request to the storage node 140. As an example, the information may comprise routing information, IP address information, port information or any other information that may be utilized by the storage node 140 to submit a response and data corresponding to the IO request to the SDC of the compute node 110 via communication pathway 208 instead providing the response and corresponding data back to the SDR of the replication node 150 as a response to the IO request received by the SDS of the storage node 140 from the SDR of the replication node 150.

Figure 5:
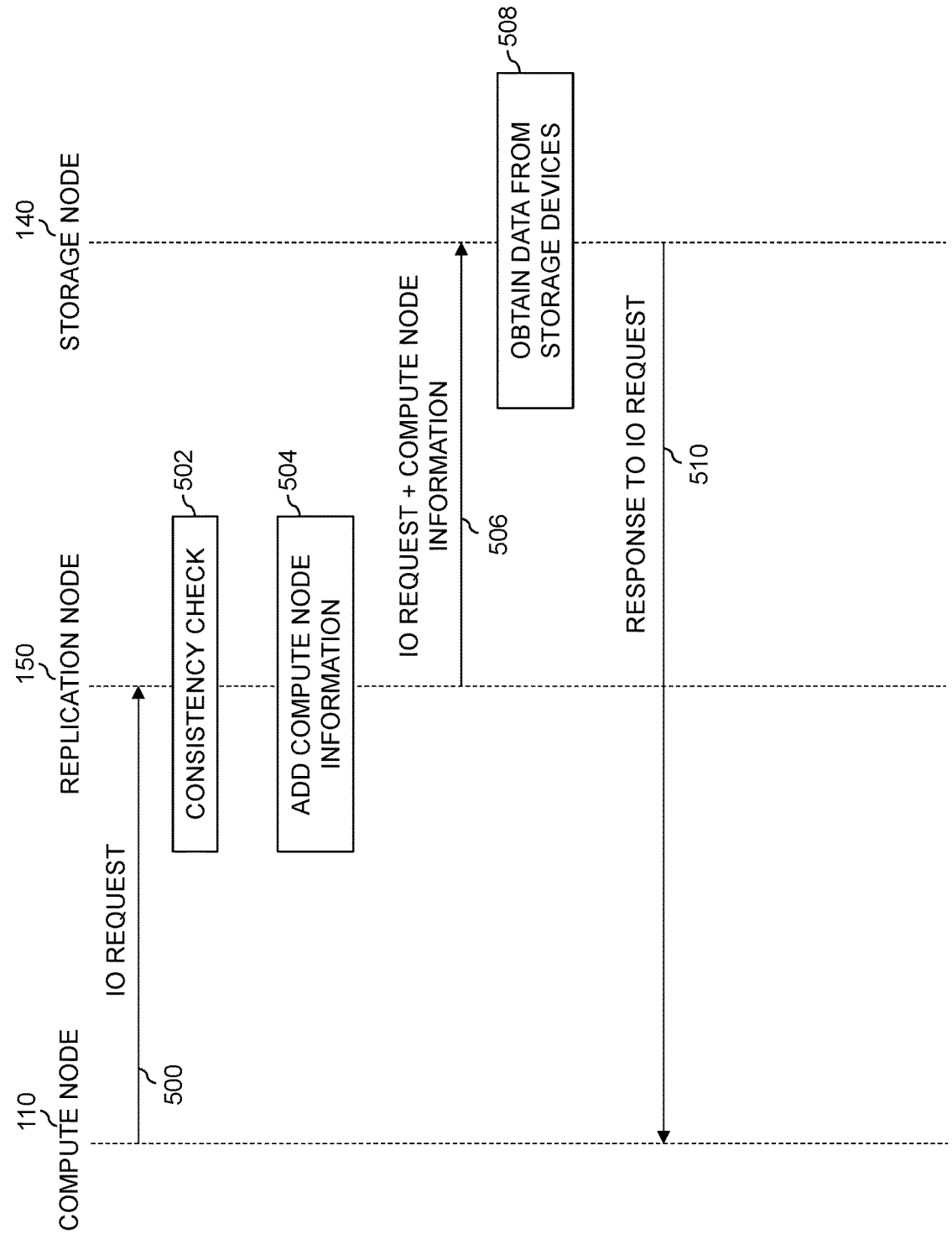
FIG. 5 is a sequence diagram illustrating a sequence for responding to an IO request according to the embodiment of FIG. 4.

With reference to FIG. 5, for example, when an IO request of an application such as, e.g., a read request, is selected for submission to the storage nodes 140 by the SDC of a compute node 110, the IO request is first submitted to the replication node 150 by the SDC at step 500.

At step 502, the SDR of the replication node 150 performs a consistency check for the data associated with the IO request and determines that the data is consistent. For example, the SDR may determine whether or not there is a pending write IO request for the corresponding data stored in cache and awaiting destaging or may perform other similar determinations.

At step 504, having determined that the consistency check is okay for this IO request, the SDR of the replication node 150 associates the information about the compute node 110 from which the IO request was obtained with the IO request. In some embodiments, for example, the information may be added or appended to the IO request. In some embodiments a message may be generated that comprises the IO request and the information about the compute node 110.

At step 506, the SDR of the replication node 150 submits the IO request and the associated information about the compute node 110 to the storage node 140 for processing. As mentioned above, the information about the compute node 110 may be appended to the IO request itself, may be submitted to the storage node 140 in the same message as the IO request but separate from the IO request, may be submitted to the storage node 140 as a separate message that indicates the association of the IO request with information of the corresponding compute node 110 or may be otherwise made available to the storage node 140 in any other manner.

At step 508, the SDS of the storage node 140 processes the IO request and obtains the corresponding data from the storage devices 146.

At step 510, the SDS of the storage node 140 provides a response to the IO request to the compute node 110, e.g., via communication pathway 208 (FIG. 4). For example, replication logic 152 may cause the SDS to provide the response to the compute node 110 via the communication pathway 208 based at least in part on the information obtained from the replication node 150 in conjunction with receipt of the IO request. In some embodiments, the response may also comprise data associated with the IO request.

As can be seen in the sequence diagram of FIG. 5, when remote replication with the disclosed replication logic 152 is implemented, the response to the IO request and the corresponding data are provided to the corresponding compute node 110 by a single hop from the storage node 140 to the compute node 110 instead of the two hops that would normally be needed to provide the response and corresponding data to the compute node 110 via the replication node 150. For large IO requests, where the available network bandwidth is being utilized as much as possible to submit the response and data, the reduction in the number of hops will cause the maximum available bandwidth on the network 120 to be improved. For example, where the two hops mentioned above resulted in an approximate halving of the available network bandwidth, the reduction in the number of hops, e.g., from two to one, may result in a significant increase in the available bandwidth of the network for use in processing IO requests and their responses from the storage nodes 140 and may also result in a reduction in the latency of processing IO requests. For example, in some cases the latency may be reduced by, e.g., approximately 25% or any other amount depending on the IO load on the system and the size, while the network overhead may be reduced by, e.g., approximately 50% or any other amount. For example, by utilizing the disclosed replication logic 152, the response time and bandwidth in a storage system with replication for a read IO request will be very close to the response time without replication, e.g., assuming the extra network time for the forwarding the IO request between the SDC and the SDS via the SDR is small and the SDR CPU overhead is also small.

In some embodiments, in conjunction with providing the information about the compute node 110 to the storage node 140, the replication logic 152 may also provide or otherwise make available to the compute node 110 an indication that this information has been provided to the SDS storage node 140. This indication may be utilized by the compute node 110 to prepare to receive the response and corresponding data from the storage node 140 without using the replication node 150 as an intermediary.

In some embodiments, the SDS of the storage node 140 may notify the SDR of the replication node 150 that the response to the IO request has been sent to the SDC via the communication pathway 208. For example, this notification may be submitted to the SDR, e.g., via communication pathway 204, in conjunction with the transmission of the response and data to the SDC of the compute node 110, e.g., via communication pathway 208, and by its nature would require a very small amount of overhead.

In some embodiments, the SDS of the storage node 140 may provide the response to the IO request to the SDR of the replication node 150 for forwarding to the compute node 110 while separately submitting the data corresponding to the IO request to the SDC of the compute node 110 over the communication pathway 208 based at least in part on the information about the compute node 110.

The particular processing operations and other system functionality described above in conjunction with the sequence diagram of FIG. 5 are presented by way of illustrative examples only, and should not be construed as limiting the scope of the disclosure in any way. Alternative embodiments can use other types of processing operations for implementing functionality for remote replication.

Functionality such as that described in conjunction with the sequence diagram of FIG. 5 can be implemented at least in part in the form of one or more software programs stored in memory and executed by a processor of a processing device such as a computer or server.

Figure 6:
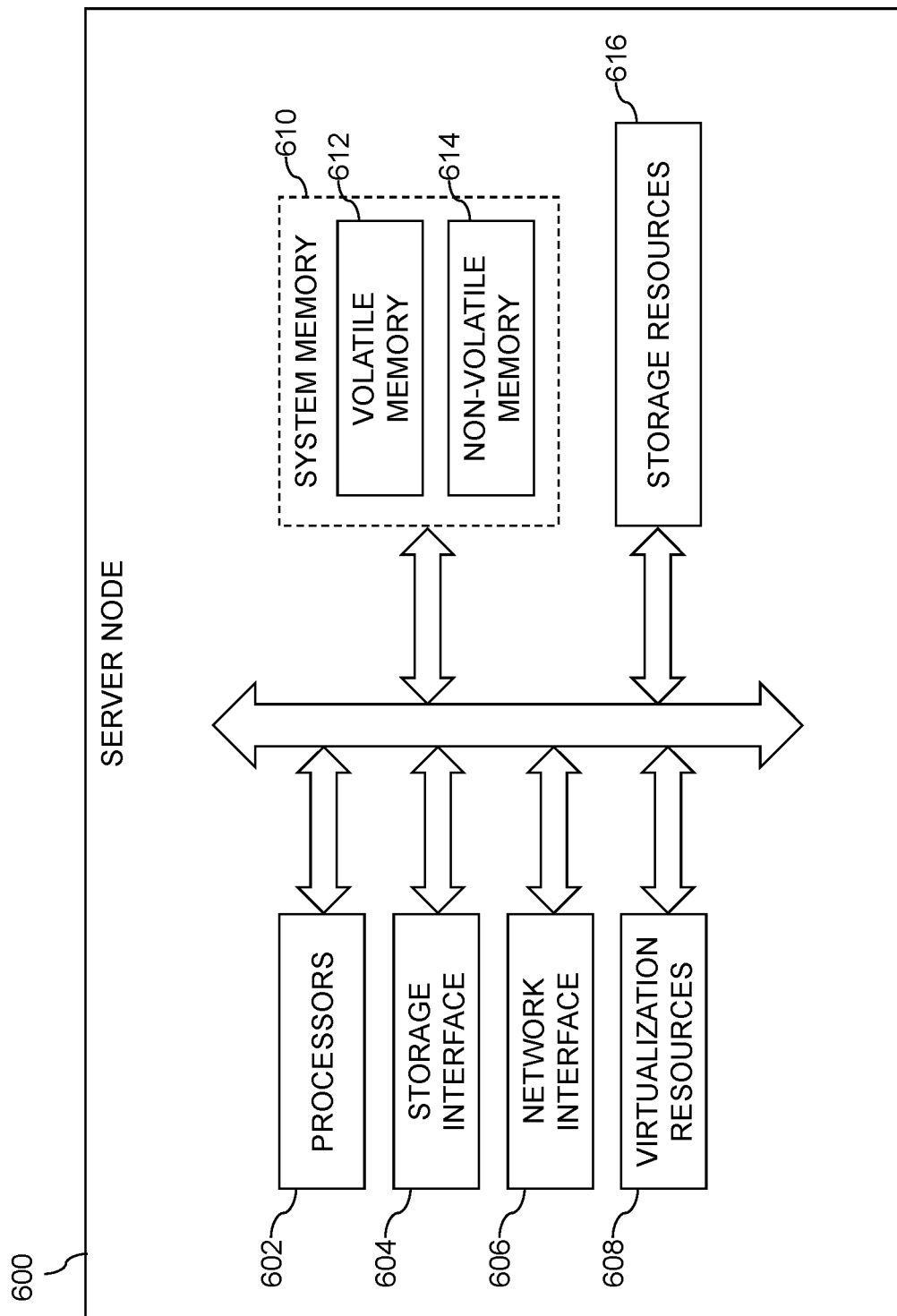
FIG. 6 schematically illustrates a framework of a server node for implementing according to an exemplary embodiment of the disclosure.

FIG. 6 schematically illustrates a framework of a server node (e.g., the storage node(s) 140 or the replication node 150, FIGS. 1A and 1B) which can be implemented for hosting a storage control system (e.g., the storage controller 142, FIG. 1B), according to an exemplary embodiment of the disclosure. The server node 600 comprises processors 602, storage interface circuitry 604, network interface circuitry 606, virtualization resources 608, system memory 610, and storage resources 616. The system memory 610 comprises volatile memory 612 and non-volatile memory 614.

The processors 602 comprise one or more types of hardware processors that are configured to process program instructions and data to execute a native operating system (OS) and applications that run on the server node 600. For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/ storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 606 enables the server node 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, IO adaptors, converged Ethernet adaptors, etc.) to support communication protocols and interfaces including, but not limited to, PCIe, DMA and RDMA data transfer protocols, etc.

The virtualization resources 608 can be instantiated to execute one or more services or functions which are hosted by the server node 600. For example, the virtualization resources 608 can be configured to implement the various modules and functionalities of the storage controller 142 or replication logic 152 as shown in FIG. 1B as discussed herein. In one embodiment, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 as well as execute one or more of the various modules and functionalities of the storage controller 142 or replication logic 152 of FIG. 1B as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the various components, systems, and modules of the storage controller 142 or replication logic 152 comprise program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of next generation non-volatile memory (NGNVM) devices. The system memory 610 can be implemented using a hierarchical memory tier structure wherein the volatile system memory 612 is configured as the highest-level memory tier, and the non-volatile system memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with IO reads and writes). The term "memory" or "system memory" as used herein refers to volatile and/or non-volatile memory which is utilized to store application program instructions that are read and processed by the processors 602 to execute a native operating system and one or more applications or processes hosted by the server node 600, and to temporarily store data that is utilized and/or generated by the native OS and application programs and processes running on the server node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. An apparatus comprising:
at least one processing device comprising a processor coupled to memory, the apparatus being configured:
to communicate with a storage node of a storage system via at least one network; and
to communicate with a compute node that implements at least a portion of an application via the at least one network;
the at least one processing device being configured:
to obtain an input-output request associated with the application from the compute node via the at least one network;
to associate information corresponding to the compute node with the input-output request, wherein associating information corresponding to the compute node with the input-output request comprises at least one of (i) appending the associated information to the input-output request, and (ii) generating a message comprising the input-output request and the associated information that corresponds to the compute node; and
to submit the input-output request and the associated information that corresponds to the compute node to the storage node, wherein the storage node is configured to submit a response to the input-output request to the compute node via the at least one network based at least in part on the information.

2. The apparatus of claim 1 wherein the at least one processing device is further configured:
to check a consistency of data corresponding to the input-output request; and to determine, based at least in part on the check, that the data is consistent; and
wherein submitting the input-output request and the associated information that corresponds to the compute node to the storage node comprises submitting the input-output request and the associated information that corresponds to the compute node to the storage node based at least in part on the determination that the data is consistent.

3. The apparatus of claim 2 wherein:
checking the consistency of the data comprises determining whether or not the data stored on the storage node that corresponds to the input-output request is up to date; and
determining that the data is consistent comprises determining that the data stored on the storage node that corresponds to the input-output request is up to date.

4. The apparatus of claim 1 wherein associating the information corresponding to the compute node with the input-output request comprises appending the information to the input-output request.

5. The apparatus of claim 1 wherein:
associating the information that corresponds to the compute node with the input-output request comprises generating a message comprising the input-output request and the associated information that corresponds to the compute node; and
submitting the input-output request and the associated information that corresponds to the compute node to the storage node comprises submitting the generated message to the storage node.

6. The apparatus of claim 1 wherein:
the at least one network comprises a first communication pathway between the compute node and the apparatus;
the at least one network comprises a second communication pathway between the apparatus and the storage node;
the at least one network comprises a third communication pathway between the storage node and the compute node;
the compute node is configured to submit the input-output request to the apparatus via the first communication pathway;
the at least one processing device is configured to submit the input-output request to the storage node via the second communication pathway; and
the storage node is configured to submit the response to the compute node via the third communication pathway.

7. The apparatus of claim 6 wherein the at least one processing device is further configured to obtain a notification from the storage node that comprises an indication that the response has been submitted to the compute node via the third communication pathway.

8. A method comprising:
obtaining an input-output request associated with an application from a compute node via at least one network, the compute node being configured to implement at least a portion of the application;
associating information corresponding to the compute node with the input-output request, wherein associating information corresponding to the compute node with the input-output request comprises at least one of (i) appending the associated information to the input-output request, and (ii) generating a message comprising the input-output request and the associated information that corresponds to the compute node; and submitting the input-output request and the associated information that corresponds to the compute node to a storage node of a storage system via the at least one network, wherein the storage node is configured to submit a response to the input-output request to the compute node via the at least one network based at least in part on the information;

wherein the method is implemented by at least one processing device of an apparatus, the at least one processing device comprising a processor coupled to memory, the apparatus being configured to communicate with the storage node of the storage system via the at least one network and to communicate with the compute node that implements the at least a portion of the application via the at least one network.

9. The method of claim 8 wherein the method further comprises:

checking a consistency of data corresponding to the input-output request, the checking comprising determining whether or not the data stored on the storage node that corresponds to the input-output request is up to date; and determining, based at least in part on the checking, that the data stored on the storage node that corresponds to the input-output request is up to date; and wherein submitting the input-output request and the associated information that corresponds to the compute node to the storage node comprises submitting the input-output request and the associated information that corresponds to the compute node to the storage node based at least in part on the determination that the data stored on the storage node that corresponds to the input-output request is up to date.

10. The method of claim 8 wherein associating the information corresponding to the compute node with the input-output request comprises appending the information to the input-output request.

11. The method of claim 8 wherein:

associating the information that corresponds to the compute node with the input-output request comprises generating a message comprising the input-output request and the associated information that corresponds to the compute node; and submitting the input-output request and the associated information that corresponds to the compute node to the storage node comprises submitting the generated message to the storage node.

12. The method of claim 8 wherein:

the at least one network comprises a first communication pathway between the compute node and the apparatus;

the at least one network comprises a second communication pathway between the apparatus and the storage node;

the at least one network comprises a third communication pathway between the storage node and the compute node;

the compute node is configured to submit the input-output request to the apparatus via the first communication pathway;

the at least one processing device is configured to submit the input-output request to the storage node via the second communication pathway; and the storage node is configured to submit the response to the compute node via the third communication pathway.

13. The method of claim 12 wherein the at least one processing device is further configured to obtain a notification from the storage node that comprises an indication that the response has been submitted to the compute node via the third communication pathway.

14. A computer program product comprising a non-transitory processor-readable storage medium having stored therein program code of one or more software programs, wherein the program code when executed by the at least one processing device of the apparatus, causes the at least one processing device to perform the method of claim 8.

15. An apparatus comprising:

a storage node comprising at least one processing device comprising a processor coupled to memory and a plurality of storage devices, the storage node being configured:

to communicate with a replication node via at least one network; and to communicate with a compute node that implements at least a portion of an application via the at least one network;

the at least one processing device being configured:

to obtain an input-output request associated with the application and information that corresponds to the compute node from the replication node via the at least one network, the replication node being configured to obtain the input-output request from the compute node; and to submit a response to the input-output request to the compute node via the at least one network based at least in part on the information that corresponds to the compute node that was obtained from the replication node;

wherein the information corresponding to the compute node is at least one of (i) appended to the input-output request by the replication node, and (ii) included in a message generated by the replication node, the message comprising the input-output request.

16. The apparatus of claim 15 wherein the replication node is configured:

to check a consistency of data corresponding to the input-output request; and to determine, based at least in part on the check, that the data is consistent; and wherein obtaining the input-output request and the information that corresponds to the compute node from the replication node comprises obtaining the input-output request and the associated information that corresponds to the compute node based at least in part on the determination by the replication node that the data is consistent.

17. The apparatus of claim 16 wherein:

checking the consistency of the data comprises determining whether or not the data stored on the plurality of storage devices that corresponds to the input-output request is up to date; and determining that the data is consistent comprises determining that the data stored on the plurality of storage devices that corresponds to the input-output request is up to date.

18. The apparatus of claim 15 wherein:

the information corresponding to the compute node is appended to the input-output request by the replication node; and obtaining the information comprises obtaining the information from the input-output request.

19. The apparatus of claim 15 wherein:

the at least one network comprises a first communication pathway between the compute node and the replication node;

the at least one network comprises a second communication pathway between the replication node and the storage node;

the at least one network comprises a third communication pathway between the storage node and the compute node;

the compute node is configured to submit the input-output request to the replication node via the first communication pathway;

the replication node is configured to submit the input-output request to the storage node via the second communication pathway; and the storage node is configured to submit the response to the compute node via the third communication pathway.

20. The apparatus of claim 19 wherein the at least one processing device is further configured to submit a notification to the replication node that comprises an indication that the response has been submitted to the compute node via the third communication pathway.

* * * * *